Feb. 28, 1939. W. J. CHIEVITZ 2,149,009
MOUNTING FOR PINION SHAFTS
Filed Jan. 14, 1938
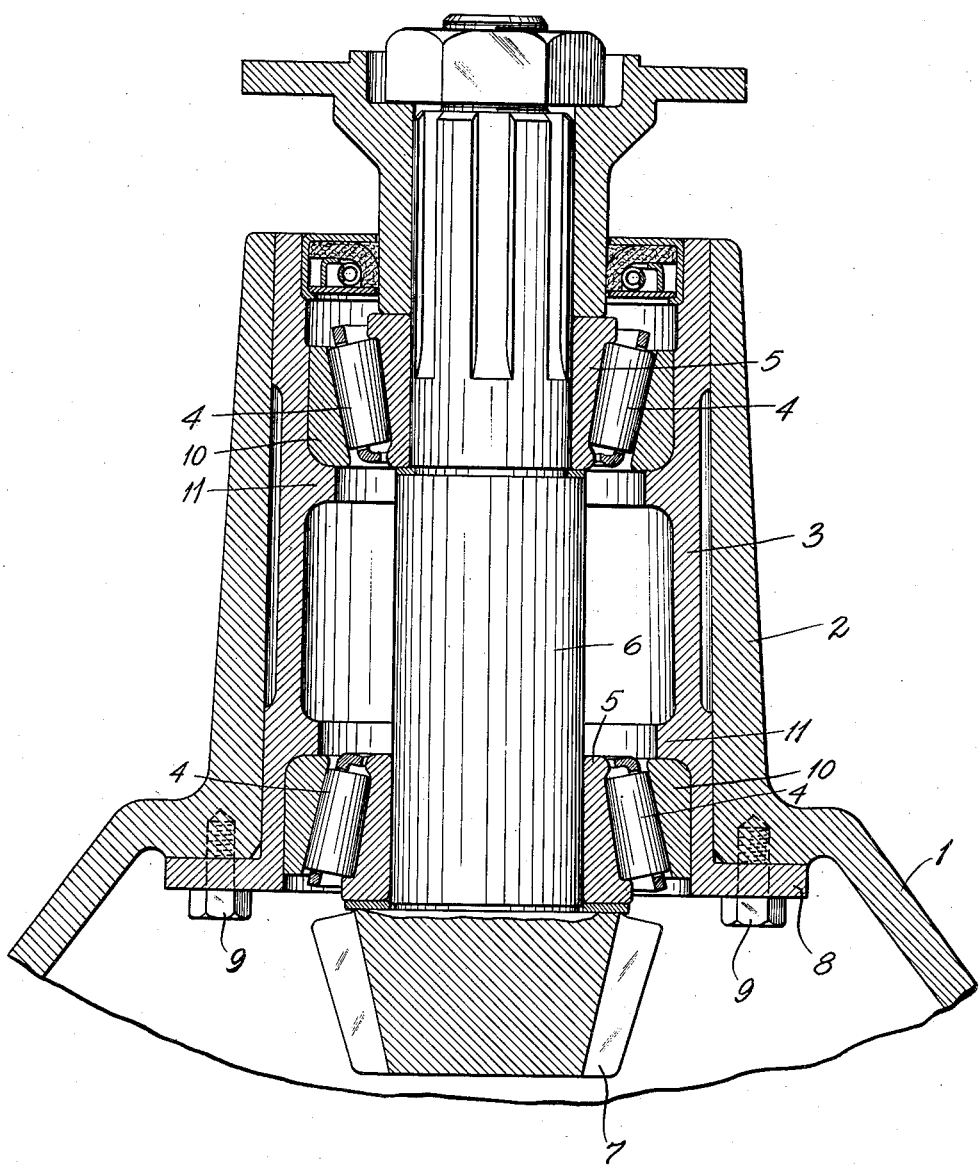
William J. Chievitz INVENTOR:
HIS ATTORNEYS.

Patented Feb. 28, 1939

2,149,009

UNITED STATES PATENT OFFICE 2,149,009

MOUNTING FOR PINION SHAFTS

William J. Chievitz, Canton, Ohio, assignor to The Timken Roller Bearing Company, Canton, Ohio, a corporation of Ohio Application January 14, 1938, Serial No. 184,941

7 Claims. (Cl. 308—207)

In the normal operation of an ordinary automobile, considerable heat is generated in the driving or propeller shaft thereof while its housing remains relatively cool, in consequence of which the shaft elongates enough to disturb the adjustment of the shaft bearings. The principal object of the present invention is to nullify or minimize this disturbing effect. The invention consists principally in mounting the shaft bearings in a sleeve which is mechanically interlocked at or near one end with the housing but is elsewhere free to slide or move longitudinally in the housing, said sleeve being made of aluminum or other metal whose coefficient of expansion for heat is considerably greater than that of the propeller shaft so that, although the sleeve does not become as hot as the propeller shaft, its actual elongation will be substantially equivalent to that of the shaft. The invention also consists in the combination and arrangement of parts hereinafter described and claimed.

The accompanying drawing, which forms part of this specification, is a view, mainly sectional, showing a pinion or propeller shaft mounted in the housing of an automobile driving axle.

Referring to the drawing, 1 indicates the housing of an automotive driving axle with a central enlargement adapted to receive a differential mechanism (not shown). 2 indicates the nosing of the housing in which is mounted a sleeve 3 which is provided in its respective ends with seats for roller bearings 4 whose rollers 4 taper toward each other. The inner raceway members 5 of these bearings are mounted on a pinion or propeller shaft 6 that is provided with a pinion 7 which meshes with the beveled ring gear of the differential mechanism. Broadly speaking, these parts are old and have been arranged in the manner stated, but heretofore the sleeve has been made of metal of substantially the same coefficient of expansion for heat as that of the shaft and housing and, therefore, is subject to having the adjustment of its bearings disturbed when the shaft becomes heated in excess of the temperatures of the sleeve and housing.

According to the present invention, the sleeve 3 is made of aluminum or some other suitable metal or alloy whose coefficient of expansion for heat is considerably greater than that of the ferrous metals of which the shaft and the housing are made. The coefficient of expansion of steel, which is commonly used for making pinion shafts, is about .00000636, that of cast iron is .00000556, that of aluminum is .00001234 and that of zinc is .00001407.

In order to permit the sleeve of my device to elongate independently of the nosing of the housing, the sleeve is mechanically interlocked only at one end with the nosing of the housing, leaving the rest of the sleeve free to slip endwise with relation to the nosing, as the sleeve elongates or contracts with changes of temperature. The sleeve 3 has a circumferential rib 8 at that end of the sleeve which is next to the pinion, said rib being inside the enlarged portion of the housing and abutting against the inside of the wall thereof to which it is scured as by means of cap screws 9. The body of the sleeve is steadied by making the bearing seat portions of the sleeve fit slidably in the nosing, but the portion of the sleeve between said seat portions is made of smaller diameter so as to leave a space between the sleeve and the housing. Each end of the sleeve has a seat formed therein for an outer raceway member 10 of a tapered roller bearing, the inner end of such raceway member abutting against a shoulder 11 provided therefor in the sleeve.

With the arrangement described the sleeve is inserted endwise in the nosing with its circumferential rib abutting against the inner face of the enlarged portion of the housing, and the shaft and bearings are easily mounted and adjusted in said sleeve. As the shaft becomes heated, it elongates; but, as the bearing at the pinion end is substantially fixed in position, the elongation of the shaft is toward the motor end thereof and tends to loosen the adjustment of the bearing at such motor end. However, the bearing sleeve itself is heated along with the shaft, although to a less extent, and as the sleeve has a considerably higher coefficient of expansion for heat than that of the shaft, the expansion of the sleeve carries forward the outer raceway member in the motor end thereof a distance that is substantially equal with the movement of its companion inner raceway member. During this operation, the temperature of the nosing undergoes very little change, on account of being exposed to the atmosphere; and, as a considerable portion of the bearing sleeve is spaced away from the nosing, the sleeve is considerably more affected by the heat of the shaft than is the case with the housing.

While I have shown and described the bearing sleeve as being mechanically interlocked at one end with the nosing by means of a circumferential rib and while this method of interlocking is especially simple and economical and permits of adjustment by shims, it is obvious that other mechanical means of anchoring the sleeve in the nosing may be used, such, for instance, as a threaded engagement. The important consideration is that the sleeve shall be anchored at or near the pinion end thereof only so that, after the pinion is once adjusted with the differential gear, the bearing at the pinion end of the shaft shall be fixed in position and temperature changes shall be accommodated by shifting of the bearing at the motor end of the shaft.

While I have described my invention as applied to the propeller shaft of an automotive axle, it is not limited to such use but is broadly applicable wherever a shaft, which is mounted on spaced bearings, is liable to become hot under service conditions while its housing remains cool. Likewise, while I have described the shaft as mounted on taper roller bearings whose rollers taper towards each other, bearings of other types may be substituted for such taper roller bearings. Likewise, instead of mechanically interlocking one end of the bearing sleeve with the housing, the sleeve may, in cases where elongation of the shaft will not disturb the enmeshment of beveled gearing, be secured to the housing along any desired narrow zone, in which event the sleeve will elongate in both directions from such narrow zone.

What I claim is:

1. The combination of a pinion shaft, a housing therefor, a sleeve inside said housing and mechanically interlocked at its pinion end therewith with the rest of the sleeve free to move longitudinally relative to the housing, and roller bearings interposed between said shaft and the respective ends of said sleeve, said sleeve having a considerably greater coefficient of expansion for heat than said shaft.

2. The combination of a shaft, a housing therefor, a sleeve inside said housing and secured thereto at a single narrow zone with the rest of the sleeve free to move longitudinally relative to the housing, and roller bearings interposed between said shaft and said sleeve, said sleeve being made of a metal whose coefficient of expansion for heat is considerably greater than that of said shaft.

3. The combination of a ferrous metal pinion shaft, a ferrous metal housing therefor, an aluminum sleeve inside said housing and mechanically interlocked at one end therewith with the rest of the sleeve free to move longitudinally relative to the housing, and roller bearings interposed between said shaft and the respective ends of said sleeve.

4. The combination of a ferrous metal pinion shaft, a ferrous metal axle housing therefor, a sleeve of metal whose coefficient of expansion for heat is considerably greater than that of the ferrous metal, said sleeve being inside said housing and mechanically interlocked therewith at its pinion end with the rest of the sleeve free to move longitudinally relative to the housing, and roller bearings interposed between said shaft and the respective ends of said sleeve.

5. The combination of a pinion shaft, a housing therefor, a sleeve having a sliding fit inside said housing and having a circumferential rib abutting against the inside of the housing wall and having bearings seats in its respective ends, and roller bearings interposed between said shaft and said seats.

6. The combination of a pinion shaft, a housing therefor, a sleeve having a sliding fit inside said housing and having a circumferential rib abutting against the inside of the housing wall and having bearing seats in its respective ends, and roller bearings interposed between said shaft and said seats, said sleeve being made of a metal whose coefficient of expansion for heat is considerably greater than that of said shaft.

7. The combination of a shaft, a housing therefor, a sleeve inside said housing and secured thereto at a single narrow zone with the rest of the sleeve free to move longitudinally relative to the housing, and tapered roller bearings spaced apart axially and interposed between said shaft and said sleeve with the rollers tapering toward each other, said sleeve being made of a metal whose coefficient of expansion for heat is considerably greater than that of said shaft.

WILLIAM J. CHIEVITZ.